United States Patent Office 3,740,341
Patented June 19, 1973

3,740,341
MANUFACTURE OF BIS(ALKOXYAMINOTRI-AZINYLAMINO)-STILBENE - 2,2' - DISULPHONIC ACIDS
Peter John Brocklehurst, Eric Hemingway, and Malcolm James Wright, Manchester, England, assignors to Imperial Chemical Industries Limited, London, England
No Drawing. Filed May 4, 1971, Ser. No. 140,298
Claims priority, application Great Britain, May 18, 1970, 23,954/70
Int. Cl. C07d 55/20
U.S. Cl. 252—301.2 W     2 Claims

ABSTRACT OF THE DISCLOSURE

Optical brightening agents which are three component mixtures obtained by the reaction of bis(3 - chloro-5-alkoxytriazinylamino)stilbene-disulphonic acids with mixtures of optionally substituted mono- or dialkylamines and optionally substituted N-alkylarylamines. The agents separate from the hot reaction mixtures in the form of mobile liquids.

This invention relates to optical brightening agents of the bistriazinylaminostilbenedisulphonic acid type and more particularly to mixtures of certain of these.

According to the invention there are provided optical brightening agents which comprise mixtures of three components of the formula:

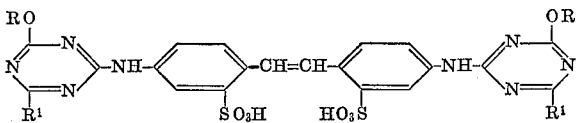

or water-soluble salts thereof wherein each R, which may be the same or different, is a lower alkyl group, and each $R^1$ is a group of the formula

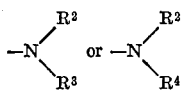

wherein $R^2$ is an alkyl or alkenyl group, optionally substituted by a hydroxyl, alkoxy or cyano group, $R^3$ is a hydrogen atom or a group $R^2$ and $R^4$ is an aryl group, optionally substituted by a lower alkyl, lower alkoxy, or cyano group or a halogen atom, and wherein in the first component both groups $R^1$ are the same and contain a group $R^3$, in the second component both groups $R^1$ are the same and contain a group $R^4$, and in the third component the two groups $R^1$ are different one being the same as the group $R^1$ in the first component and the other the same as the groups $R^1$ in the second component.

As lower alkyl group there is meant any alkyl group containing not more than 4 carbon atoms, and preferably an ethyl or methyl group.

As groups which may be represented by $R^2$ there are mentioned alkyl groups such as methyl, ethyl, propyl and butyl, alkenyl groups such as allyl, and substituted alkyl groups such as β-cyanoethyl.

As optionally substituted aryl groups which may be represented by $R^4$ there are mentioned phenyl, o-, m- and p-tolyl, α and β-naphthyl, o-methoxyphenyl, o-, m- and p-chlorophenyl, and cyanophenyl.

As water-soluble salts there are mentioned alkali metal, e.g. sodium and potassium, salts, ammonium salts, and salts of amines such as monoethanolamine and diethanolamine.

It is preferred that the relative proportions of the two groups represented by $R^1$ should be between 9:1 and 1:1, but proportions outside this range may be used if desired.

The optical brightening agents of the invention may be a more complex mixture than three component, for example it may contain other components of the same general formulae but having different values for R and/or $R^1$.

The optical brightening agents of the invention may be conveniently prepared by interacting, in any order but preferably in the following order, cyanuric chloride with an alcohol, 4,4'-diaminostilbene-2,2'-disulphonic acid and a mixture of two amines each represented by the formulae $R^1H$. Each stage of this synthesis is carried out under conventional conditions for the successive reaction of cyanuric chloride with these types of reactants.

The optical brightening agents of the invention have the advantage that they separate from the aqueous reaction medium at temperatures above about 70° C. in the form of mobile liquids, which are readily isolated from the aqueous medium, for example by separation or decantation, and are easily handled and transferred, for example by pumping through heated pipes. For satisfactory yields of whitening agent the reactants should be used in such amounts that the concentration of optical whitening agent in the final aqueous reaction medium is in general at least 5%. The yield may be increased by adding a salt, suitably an alkali metal, ammonium or substituted ammonium salt of a halogen acid or sulphuric acid, such as sodium chloride to the aqueous medium. This method of isolation and the product obtained represent further features of the invention.

A similar procedure with known optical brightening agents of the bistrizinylaminostilbenedisulphonic acid type affords a solid product which is difficult to obtain in good yield free from inorganic contaminants in the reaction medium. In certain cases liquids are obtained but these are not so mobile and therefore more difficult to isolate and handle than the optical brightening agents of this invention.

The mobile liquid, which tends to solidify to a glass at temperatures below 60° C., will usually comprise from 50 to 60% of optical brightening agent, up to 1% of inorganic salts by-products of the manufacturing process, and from 40 to 50% of water.

If it is desired to formulate the optical brightening agent in a liquid form the mobile liquid may be dissolved without further treatment in the desired water-miscible organic solvent, for example ethylene glycol or an ether thereof or an alkanolamine such as ethanolamine or triethanolamine with varying amounts of water according to the desired final strength.

If it is desired to obtain the optical brightening agent in solid form the mobile liquid may be readily dried continuously e.g. on a drum drier or in a spray drier.

The optical brightening agents of the invention are very effective as whitening agents for materials such as especially polyamide and cellulosic textile materials when applied from aqueous media. They may also be used in coating, for example sole latex coating of paper.

The invention is illustrated but not limited by the following examples in which all parts and percentages are by weight unless otherwise stated.

EXAMPLE 1

38.8 parts of cyanuric chloride are added portion-wise to a slurry of 29.1 parts of disodium hydrogen phosphate in 96 parts of methanol during 30 minutes at 20–50° C., and the mixture stirred for a further 30 minutes at 20–25° C., 41.4 parts of 4,4-diaminostilbene-2,2'-disulphonic acid disodium salt dissolved in 800 parts of water at 35–40° C. are added evenly over 30 minutes at 25–30° C., the pH being maintained at 5–6 by the addition of sodium hydroxide solution. After heating to 40° C. for 1 hour a mixture of 19.3 parts of N-methylaniline and 2.1 parts of diethanolamine is added and the temperature raised to 85°

C. and sodium hydroxide solution added to maintain a pH of 8–9 during 2 hours. The temperature is raised and the excess methanol allowed to distill off until the temperature reaches 100° C. The reaction mixture is allowed to stand and the aqueous layer separated from the lower liquid layer at a temperature above 90°. 76 parts of triethanolamine are added to the oily residue followed by sufficient water to make the final weight equal to 253 parts. The resulting solution contains almost 75 parts of brightening agent.

EXAMPLE 2

Using the quantities and conditions of Example 1 but with a mixture of 19.3 parts of N-methylaniline and 2.9 parts of diethylamine a mobile liquid is obtained which is run off into trays and air dried at 80° C. 83 parts of a pale yellow powder are obtained.

EXAMPLE 3

Using the quantities and conditions of Example 1 but with a mixture of 21.6 parts of N-ethyl-o-toluidene and 2.5 parts of monoethanolamine a mobile liquid is obtained which is run off and air dried at 80° C. to give 71 parts of pale yellow powder.

EXAMPLE 4

Using the quantities and conditions of Example 1 but ethanol instead of methanol a solution containing about 79 parts of brightening agent is obtained.

EXAMPLE 5

100 parts of polyhexamethylene adipamide fiber are immersed in a bath containing 1 part of the liquid prepared as described in Example 1 and 2 parts of glacial acetic acid and sufficient water to make the goods:liquor ratio 1:30. The mixture is agitated and warmed to 60° C. for 39 minutes and the fabric removed, rinsed and dried. It is much whiter in appearance than untreated fabric.

EXAMPLE 6

Using the quantities and conditions of Example 1 but with a mixture of 24.2 parts of N-β-hydroxyethyl-o-toluidene and 2.4 parts of monoethanolamine a mobile liquid is obtained which is run off and air dried at 80° C. to give 60 parts of pale yellow powder.

EXAMPLE 7

Using the quantities and conditions of Example 7 but with a mixture of 24.7 parts of N-β-hydroxyethylaniline and 2.5 parts of bis(β-cyanoethyl)-amine a mobile liquid is obtained which is run off into trays and air dried at 80° C. 68 parts of a pale yellow powder are obtained.

EXAMPLE 8

Using the quantities and conditions of Example 1 but with a mixture of 23.8 parts of N-cyanomethyl aniline and 1.1 parts of allylamine a mobile liquid is obtained when 15 parts of salt are added. This liquid is run off into trays and air dried at 80° C. 84 parts of yellow powder are obtained.

EXAMPLE 9

Using the quantities and conditions of Example 1 but with a mixture of 26.4 parts of N-β-methoxyethyl-m-toluidene and 2.4 parts of β-ethoxyethylamine a mobile liquid is obtained which is run off into trays and air dried at 80° C. 58 parts of a pale yellow powder are obtained.

EXAMPLE 10

Using the quantities and conditions of Example 1 but with a mixture of 19.2 parts of N-methylaniline and 3.2 parts of bis-(β-ethoxyethyl)-amine a mobile liquid is obtained which is run off and air dried at 80° C. to give 74 parts of pale yellow powder.

We claim:
1. A process for producing an optical brightening agent comprising a mixture of three components of the formula

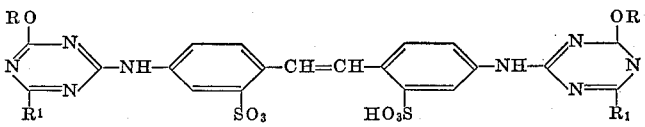

or water soluble salts thereof, wherein each R, which may be the same or different, is lower alkyl and each $R^1$ is a group of the formula:

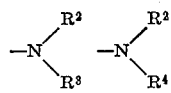

wherein $R^2$ is alkyl or alkenyl, optionally substituted by hydroxyl, alkoxy or cyano, $R^3$ is hydrogen or $R^2$ which has the meaning given above and $R^4$ is phenyl optionally substituted by lower alkyl, lower alkoxy, cyano or halogen and wherein in the first component both $R^1$ substituents are the same and contain $R^3$, in the second component both $R^1$ substituents are the same and contain $R^4$ and in the third component the two $R^1$ substituents are different, one being the $R^1$ substituent in the first component and the other being the $R^1$ in the second component, the steps comprising interacting in an aqueous medium cyanuric chloride with an alcohol ROH wherein R has the meaning given above, 4,4'-diaminostilbene-2,2'-disulphonic acid and a mixture of two amines each represented by the formula $R^1H$ wherein each $R^1$ has the meaning given above, the relative proportions of the two amines being between 9:1 and 1:1, separating the resulting optical brightening agent as a liquid from the reaction mixture at a temperature above about 70° C. and dissolving the separated optical brightening agent in a member selected from the group consisting of ethylene glycol or an ether thereof or an alkanolamine, and optionally water.

2. The process of claim 1 which also includes adding an alkali metal or ammonium salt of a halogen acid or sulphuric acid to the reaction mixture prior to separating the resulting optical brightening agent therefrom.

References Cited
FOREIGN PATENTS
528,443    7/1956    Canada _____ 260—240 B

JOHN D. RANDOLPH, Primary Examiner

U.S. Cl. X.R.

117—33.5 T; 260—240 B